J. F. CRAWFORD.
Mowing Machine.
No. 98,671.  Patented Jan. 11, 1870.
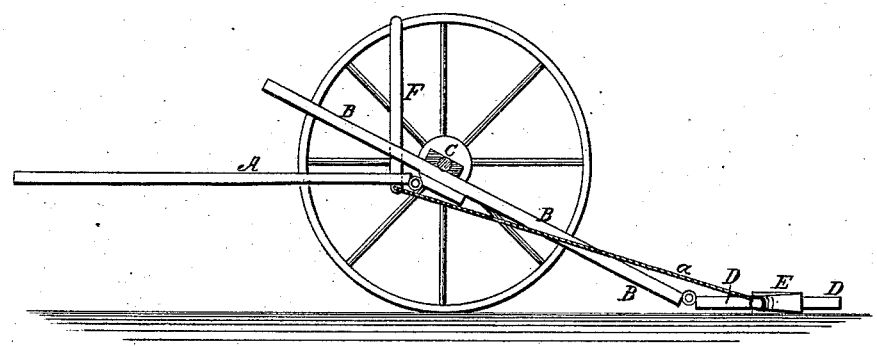
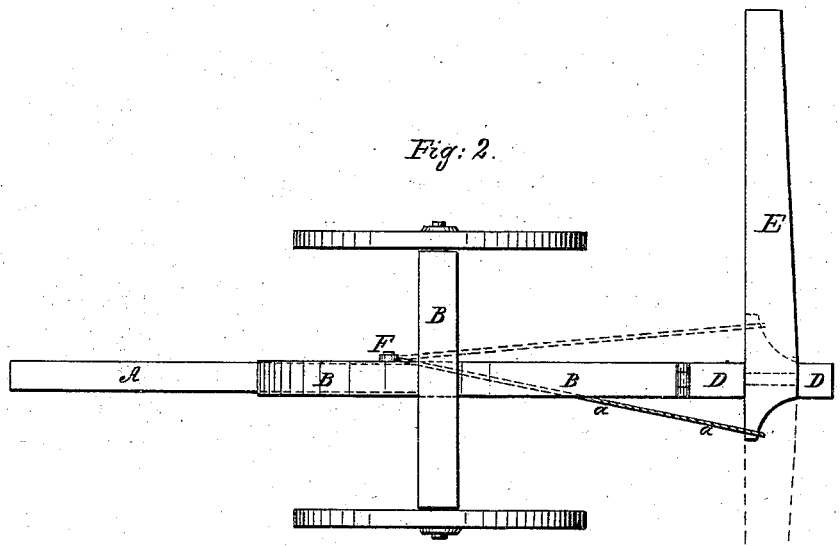
Witnesses.  Inventor.

UNITED STATES PATENT OFFICE.

J. F. CRAWFORD, OF NEW YORK MILLS, NEW YORK.

IMPROVEMENT IN HARVESTERS.

Specification forming part of Letters Patent No. 98,671, dated January 11, 1870.

*To all whom it may concern:*

Be it known that I, J. F. CRAWFORD, of New York Mills, in the county of Oneida and State of New York, have invented a new and useful Improvement in Grass and Grain Harvesters; and I do hereby declare that the following is a full, clear, and exact description thereof, which will enable those skilled in the art to make and use the same, reference being had to the accompanying drawings, forming part of this specification.

My invention relates to machines for harvesting grain or grass; and consists in a certain construction and arrangement of mechanism, which will be more fully specified hereinafter.

On hill-sides, in high winds, and in lodged grain or grass it is a very important desideratum to reverse the cutter, and my chief object is to accomplish this.

Figure 1 represents a longitudinal section of a harvester provided with my improvements. Fig. 2 represents a plan view of the same.

Similar letters of reference indicate corresponding parts.

The frame B is constructed in the shape of a cross, and is provided, near the center, with a bevel-wheel. This frame has bearings at each end and near the center thereof, in which revolves the shaft whereon the draft-wheels are made fast.

On one end of this frame is a bolt, to which is pivoted the cutter-bar. By this construction the cutter-bar vibrates in two vertical planes at right angles to each other.

A lever, F, pivoted to the frame, and a strap, a, are attached to the projecting end of the cutter, by which it may be readily thrown from one side to the other. When it is desired to do this, the front of the frame is depressed, so as to raise the cutter-bar from the ground and cause it to swing loosely upon the hinged projection, which is thus made to hang in a nearly perpendicular line.

Having thus described all that is necessary to a clear understanding of my invention, what I desire to protect by Letters Patent is—

A cutter-bar for harvesters fulcrumed on a pin, and removable from one side to the other by means of lever F and strap a, as shown and described.

J. F. CRAWFORD.

Witnesses:
 A. B. GREGG,
 L. C. QUEAL.